United States Patent
Magg et al.

(10) Patent No.: US 8,528,467 B2
(45) Date of Patent: Sep. 10, 2013

(54) COFFEE MACHINE WITH A CONTINUOUS FLOW HEATER

(75) Inventors: Johann Magg, St. Georgen (DE); Andreas Mayr, Breitbrunn am Chiemsee (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 2013 days.

(21) Appl. No.: 10/587,296

(22) PCT Filed: Jan. 24, 2005

(86) PCT No.: PCT/EP2005/050292
§ 371 (c)(1),
(2), (4) Date: Apr. 13, 2007

(87) PCT Pub. No.: WO2005/072586
PCT Pub. Date: Aug. 11, 2005

(65) Prior Publication Data
US 2008/0028947 A1 Feb. 7, 2008

(30) Foreign Application Priority Data
Jan. 30, 2004 (DE) .......................... 10 2004 004 816

(51) Int. Cl.
*A47J 31/00* (2006.01)

(52) U.S. Cl.
USPC ............. 99/295; 99/302 R; 392/471; 392/480

(58) Field of Classification Search
USPC ............... 99/280, 281, 282, 283, 295, 302 R; 392/471, 480
See application file for complete search history.

(56) References Cited

U.S. PATENT DOCUMENTS

| | | | |
|---|---|---|---|
| 4,371,777 A | 2/1983 | Roller et al. | |
| 4,501,952 A * | 2/1985 | Lehrke | 392/491 |
| 4,949,627 A * | 8/1990 | Nordskog | 99/281 |
| 5,280,560 A | 1/1994 | Salomon | |
| 5,357,848 A | 10/1994 | Eugster et al. | |
| 6,766,106 B2 * | 7/2004 | Roberson | 392/442 |
| 2002/0014161 A1 | 2/2002 | Mork et al. | |
| 2003/0066431 A1* | 4/2003 | Fanzutti et al. | 99/279 |
| 2004/0018009 A1 | 1/2004 | Lin | |
| 2005/0076789 A1* | 4/2005 | Tebo | 99/279 |
| 2006/0102010 A1* | 5/2006 | Burrows | 99/279 |

FOREIGN PATENT DOCUMENTS

| | | |
|---|---|---|
| CH | 671 326 | 8/1989 |
| DE | 28 56 518 | 7/1980 |
| DE | 83 35 620 U1 | 3/1985 |
| DE | 39 03 649 | 4/1990 |
| DE | 298 09 279 U1 | 10/1998 |
| DE | 198 56 386 | 7/2000 |
| GB | 2 318 173 | 4/1998 |
| WO | WO 03/030696 | 4/2003 |

* cited by examiner

*Primary Examiner* — Reginald L Alexander
(74) *Attorney, Agent, or Firm* — James E. Howard; Andre Pallapies

(57) ABSTRACT

A coffee machine for preparing coffee, particularly on the basis of coffee pads, comprising a continuous flow heater which is fixed in a housing and provided with a tube for guiding water. In order to fix the continuous flow heater and, preferably, other components in the coffee machine in a low-cost and secure manner, the at least one flexible tube connecting piece is provided with receiving elements for integrating additional component parts of the coffee machine.

18 Claims, 3 Drawing Sheets

COFFEE MACHINE WITH A CONTINUOUS FLOW HEATER

The invention relates to a coffee machine.

Coffee machines in the prior art operate according to different principles. The most common models are the so-called pressureless coffee machines. In these water flows from a storage container into an electrically heatable pipe. Particularly as a result of the evolution of steam in this pipe, heated water is then pushed through a riser to an outlet via which the heated water then drips into a coffee filter. The filter coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates on a different principle, it is provided to first transfer the water for preparing the coffee from a water container into a heatable intermediate container. From this intermediate container the heated water is passed to an electric-motor-driven pump from which it is supplied at elevated pressure, for example 2 to 3 bar, to a coffee grounds receiving device. In this case, it is provided that unlike in the espresso machine the coffee is not introduced into the coffee grounds receiving device in loose form as coffee grounds but is inserted in a retainer in the form of a coffee pad, that is, in compacted form surrounded by filter paper. The retainer with a retainer cover via which water is supplied can form a sealed pressure chamber. At the same time, the retainer for the coffee pads is allocated a plurality of functions. Firstly, the retainer provides a sealing surface so that a pressure chamber can be formed. Moreover, the retainer has an outlet opening from which the coffee can emerge. Furthermore, the coffee pad should be mounted in the retainer in a manner such that flow through the coffee pad is not impeded. Such a coffee machine occupies an intermediate position between a conventional pressureless coffee machine and an espresso machine.

In particular in connection with coffee machines which prepare coffee on the basis of coffee pads, the water conveyed by the pump can be heated in a continuous flow heater. WO 03/030696 A1 describes such a coffee machine. The continuous flow heater comprises a tubular section which is partially enclosed by heating elements embedded in cast aluminium. This entire arrangement with further components is surrounded by a housing whereby the continuous flow heater is inserted in the coffee machine housing. Such a solution is complex and thus associated with high costs.

It is the object of the invention to provide a coffee machine with a continuous flow heater which can be manufactured simply and cost-effectively, and in particular is improved with regard to the assembly of the continuous flow heater and other components in the housing.

This object is achieved with the features of the independent claims.

Advantageous embodiments of the invention are given in the dependent claims.

The invention builds on the generic coffee machine in that the at least one flexible tube connecting piece is provided with receiving elements for integrating additional component parts of the coffee machine.

In this connection, it is particularly advantageous that a safety valve, temperature sensor and/or a reed switch as a water level sensor is provided as an additional component. A safety valve can be integrated, for example, in the upper flexible tube connecting piece of the continuous flow heater which is generally mounted vertically. A reed switch for detecting the water level is usefully integrated on the lower flexible tube connecting piece.

It is usefully provided that the at least one flexible tube connecting piece is made of plastic, in particular is made of high-temperature resistant plastic. A heat-resistant plastic provides good heat insulation between the continuous flow heater and the housing or the hoses. Furthermore, securing means for centring the continuous flow heater in the housing and which provide the possibility of securing the continuous flow heater, can be moulded simply on the flexible tube connecting pieces made of plastic.

It is likewise advantageous that the at least one flexible tube connecting piece comprises securing means.

Furthermore, it is usefully provided in this connection that the continuous flow heater is held in the housing by the securing means. The alignment of the continuous flow heater in the housing is a critical quantity since it must avoided that the hot component is disposed too close to other housing parts or other components. Consequently, it is advantageous that the correct means for centring the continuous flow heater are provided immediately, so that any misalignment can be avoided.

It is furthermore particularly useful that the securing means has receiving elements for integrating additional components of the coffee machine. Since continuations or similar can simply be moulded onto the flexible tube connecting pieces made of plastic, the configuration of the flexible tube connecting piece is suitable for attaching further elements.

Furthermore, the coffee machine according to the invention can usefully be constructed such that the pipe of the continuous flow heater is thermally connected to at least one, preferably two heating rods by means of at least one flat contact surface. This type of continuous flow heater can be manufactured particularly simply. For example, a flattened pipe can provide a flat contact surface and can be provided by simply pressing together a pipe area. As a result of the flattened areas, large areas are provided for heat transfer between the pipe and a flattened heating rod. Since no cast parts are required, the mass of the continuous flow heater is comparatively low.

The coffee machine according to the invention is preferably configured so that the arrangement of pipe and heating rods is held together by a sleeve. Such a sleeve is to be preferred to a complex housing with regard to the manufacturing simplicity. The sleeve can be made of heat-resistant plastic or of metal.

It is usefully provided that a temperature sensor is provided on the sleeve. Since the sleeve is preferably located at the centre of the elongated continuous flow heater to hold the components securely together, it is located on a preferred site for a temperature sensor. In this respect, it is possible to arrange a temperature sensor in the area of the sleeve and mount this on the sleeve.

The flexible tube connecting pieces according to the invention can be internally or externally sealing and provide a simple possibility for pushing on a hose for supplying or removing water.

It is preferable that the at least one flexible tube connecting piece comprises sealing means which abut against an inner wall of the pipe by which means the at least one flexible tube connecting piece is connected to the ends of the pipe in a sealed manner. The flexible tube connecting pieces can thus be connected to the pipe in a sealed manner without further precautions.

The sealing means is preferably formed by an O-ring seal inserted in an annular groove on the outer circumference of the flexible tube connecting piece.

For improving the sealing effect, a plurality of axially spaced O-ring seals can be provided on the flexible tube connecting pieces.

Both in the variant comprising a sealing means or an O-ring seal and also in the variant comprising a plurality of sealing means or O-ring seals, the flexible tube connecting piece can be embodied as conical and inserted into a corresponding conical end of the pipe. In addition to the sealing effect, the assembly and fit of the flexible tube connecting piece in the pipe is thereby improved.

The invention is based on the finding that a continuous flow heater can be mounted in a particularly cost-effective and reliable manner in a coffee machine by using flexible tube connecting pieces preferably made of heat-resistant plastic which at the same time provide securing means both for the continuous flow heater on the housing and also for additional components of the coffee machine.

The invention is now explained in detail with reference to the accompanying drawings using particularly preferred embodiments. In the figures.

In the following description of the drawings the same reference numerals denote the same or comparable components.

Figure 1:
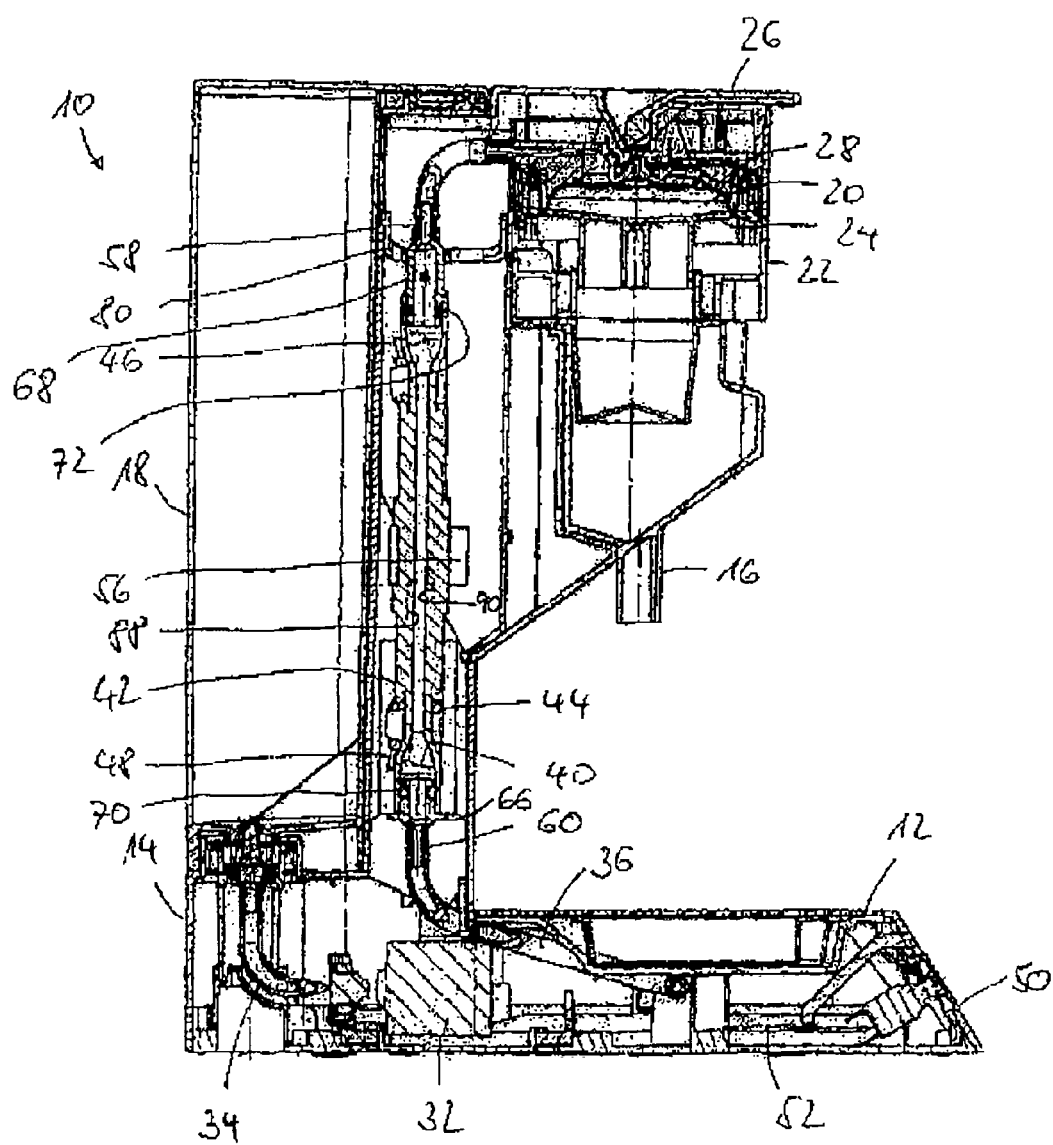
FIG. 1 is a sectional view of a coffee machine to explain the invention.
Figure 2:
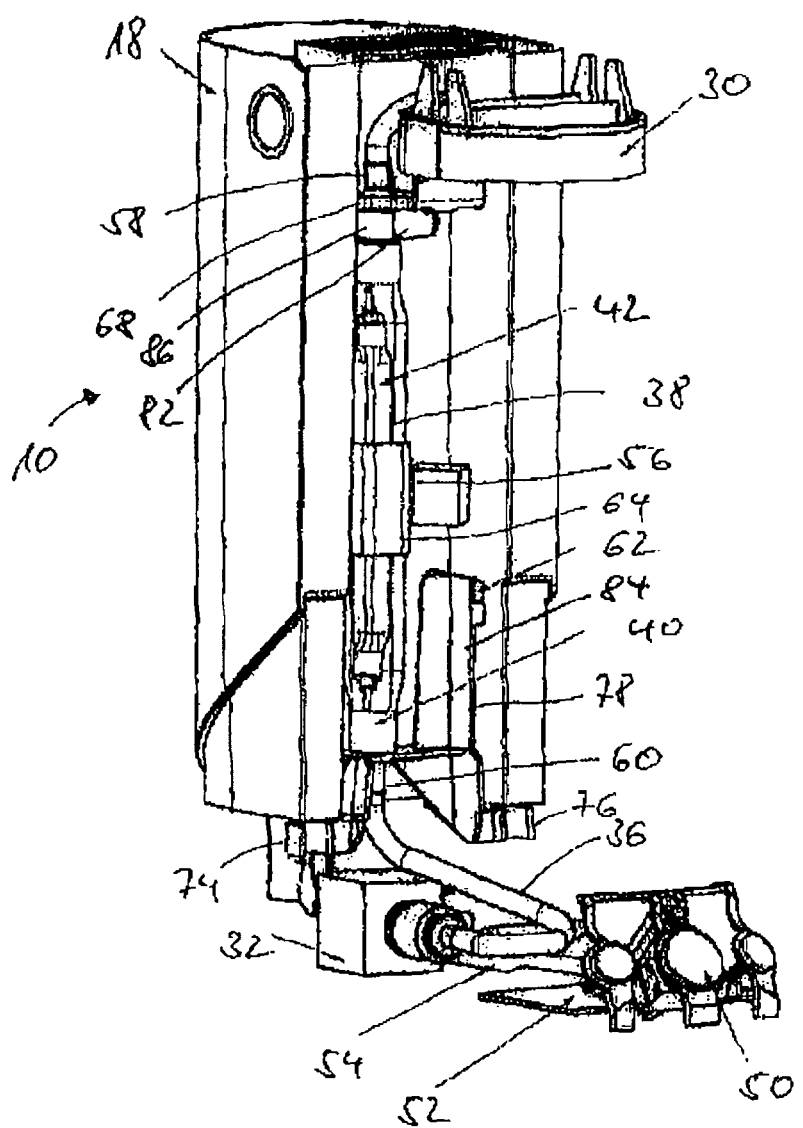
FIG. 2 is a perspective view of a housing part as well as components arranged in the housing to explain the invention.
Figure 3:
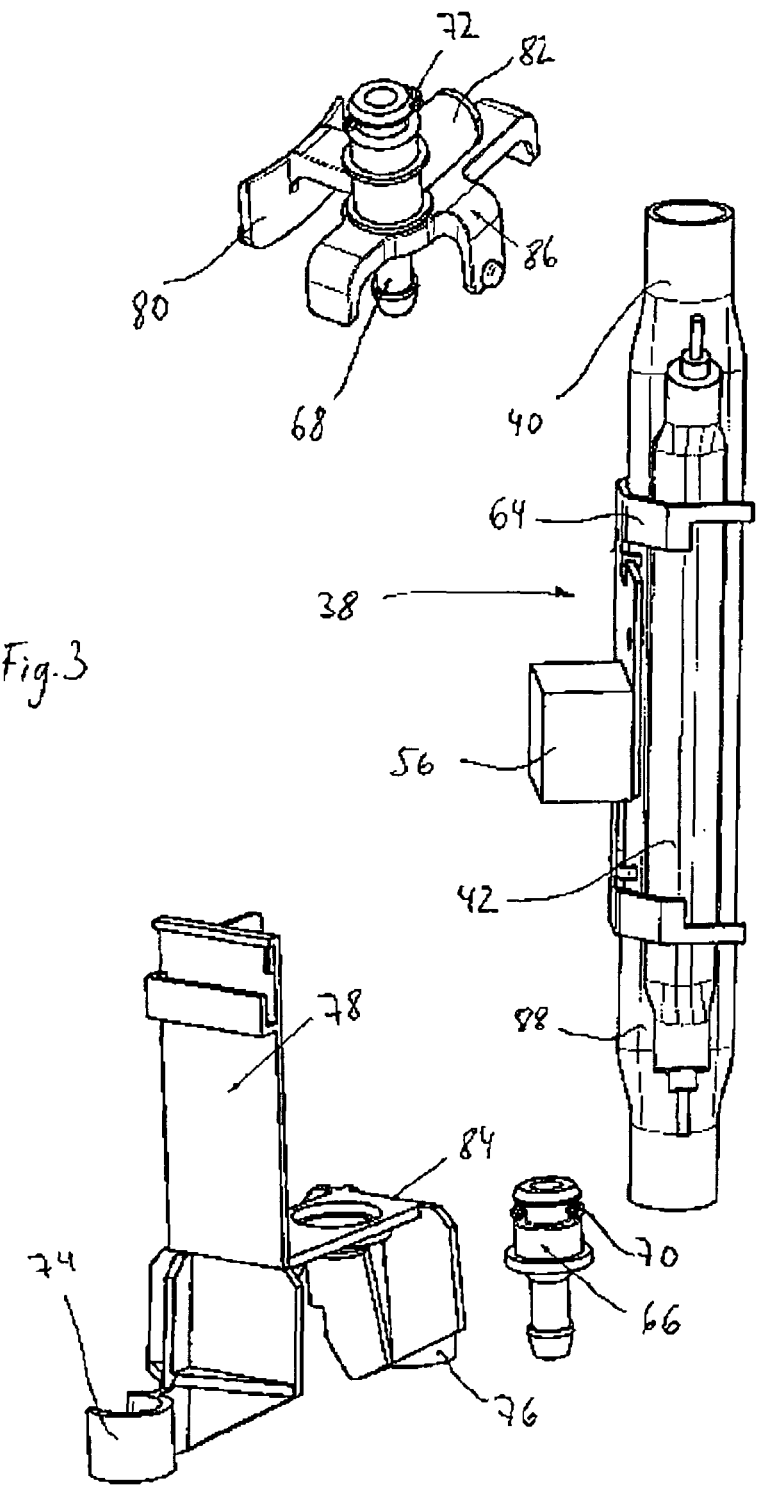
FIG. 3 is an exploded view of the continuous flow heater, flexible tube connecting pieces and receiving elements.

FIG. 1 shows a sectional view of a coffee machine to explain the invention. FIG. 2 shows a perspective view of a housing part as well as components arranged in the housing to explain the present invention. In FIG. 3 the continuous flow heater 38, flexible tube connecting pieces 66, 68 and receiving elements 84, 86 are shown in an exploded view. The coffee machine 10 comprises a flat front portion 12 and a columnar rear assembly 14. Cups for removing coffee via an outlet 16 can be arranged on the front portion 12. A water container 18 is inserted in the rear assembly 14. The rear assembly 14 further comprises a brewing chamber 20 formed by a coffee pad retainer 24 which can be supplied with a drawer and an elastic retainer cover 28 as the upper portion of the brewing chamber 30. A lever mechanism is provided with a lever 26 in order to seal the coffee pad retainer 24 and the retainer cover 28 with respect to one another after inserting the drawer 22. In the state shown the lever mechanism pulls the coffee pad retainer 24 towards the retainer cover 28. If the lever 26 is shifted backwards by 90°, the coffee pad retainer 24 is lowered so that it can be removed from the coffee machine 10 together with the drawer 22.

Components for supplying water, for heating water and for controlling these processes are provided inside the housing formed by the front portion 12 and the rear assembly 14. Located in the lower housing area at the boundary between the front portion 12 and the rear assembly 14 is a pump 32 to which water is supplied from the water container 18 via a hose 34. The pump 32 is connected to the continuous flow heater 38 by means of another hose 36. Important components of this continuous flow heater 38 are a pipe 40 used to carry water and two heating rods 42, 44. These heating rods 42, 44 each have two electrical connections 46, 48 to which the heating voltage is applied. Provided on the front portion 12 of the coffee machine 10 is a keypad 50 which is connected to a printed circuit board 52, said printed circuit board 52 preferably controlling all the functions of the coffee machine, especially the functions with regard to the conveyance and heating of the water. Starting from the printed circuit board 52 there is provided a cable run 54 which combines the electrical leads via which the electronic controller delivers its control commands and receives input information. This input information particularly relates to the temperature of the continuous flow heater detected by a temperature sensor 56 and preferably further temperature information which is recorded by temperature sensors at measuring points 58, 60 downstream or upstream from the continuous flow heater 38 in the direction of flow. A reed switch 62 is further provided in the rear assembly 14. The task of the reed switch 62 is to electrically detect a minimum filling level in the water container 18. For this purpose a float comprising a magnet is located vertically displaceably in the water container 18. When the water falls below a minimum filling volume in the water container 18, the magnetic float is located near to the reed switch 22 and makes this switch on, closing a circuit which transmits a signal to the electronic controller that the level is too low. If the level in the water container is lower than the minimum filling volume, the coffee machine cannot be operated. The continuous flow heater 38 can also have a sensor which prevents any running dry during the heating process.

The pipe 60 of the continuous flow heater 38 is flattened in the area in which the heating rods 42, 44 abut against the pipe 60. In this way, contact surfaces 88, 90 are preferably provided over the entire or almost the entire length of the continuous flow heater 38, a radial position of the contact surfaces 88, 90 being shown by the broken lines in FIG. 1 as an example. If the heating rods are correspondingly designed likewise with a flat side, good contact and consequently good heat transfer can be accomplished between the heating rods 42, 44 and the pipe 60. The arrangement of pipe 60 and heating rods 42, 44 is held together by a sleeve 64 which can be made of heat-resistant plastic or metal. The temperature sensor 56 is located in the area of this sleeve 64. Flexible tube connecting pieces 66, 68 are attached to the ends of the pipe 60. In the present exemplary embodiment, these are inserted in the pipe 60 and fitted with a circumferential seal 70, 72, for example, an O-ring. Securing means 74, 76, 78, 80 are moulded onto the flexible tube connecting pieces 66, 68 made of heat-resistant plastic, only some of the securing means being identified with reference numerals as an example here. These securing means 74, 76, 78, 80 are used to secure and centre the continuous flow heater 38 in the housing and also provide receiving elements for additional components, for example, a receiving element 84 for the reed switch 62 in the securing means 78. A receiving element 86 for a safety valve 82 is furthermore built into the flexible tube connecting piece 68. The continuous flow heater 38 can thus be mounted as a complete unit with the flexible tube connecting pieces 66, 68 and the hoses placed thereon and can easily be inserted in the housing as a result of centring properties.

The features of the invention disclosed in the preceding description, in the drawings and in the claims can be important for carrying out the invention both individually and also in any combination.

REFERENCE LIST

10 Coffee machine
12 Front portion

14 Rear assembly
16 Outlet
18 Water container
20 Brewing chamber
22 Drawer
24 Coffee pad retainer
26 Lever
28 Retainer cover
30 Brewing chamber upper portion
32 Pump
34 Hose
36 Hose
38 Continuous flow heater
40 Pipe
42 Heating rod
44 Heating rod
46 Electrical connection
48 Electrical connection
50 Keypad
52 Printed circuit board
54 Cable run
56 Temperature sensor
58 Measurement point
60 Measurement point
62 Reed switch
64 Sleeve
66 Flexible tube connecting piece
68 Flexible tube connecting piece
70 Seal
72 Seal
74 Securing means
76 Securing means
78 Securing means
80 Securing means
82 Safety valve
84 Receiving element
86 Receiving element
88 Contact surface
90 Contact surface

The invention claimed is:

1. A coffee machine for preparing coffee using coffee pads, which comprises a continuous flow heater secured in a housing with a pipe for guiding water, which has a flexible tube connecting piece at one end, the flexible tube connecting piece including receiving elements for integrating additional components of the coffee machine.

2. The coffee machine according to claim 1, further comprising a safety valve as an additional component.

3. The coffee machine according to claim 1, further comprising a reed switch as a water level sensor as an additional component.

4. The coffee machine according to claim 1, wherein the flexible tube connecting piece is made from a high-temperature resistant plastic material.

5. The coffee machine according to claim 1, wherein the flexible tube connecting piece includes a securing means for securing the continuous flow heater in the housing.

6. The coffee machine according to claim 5, wherein the securing means includes additional receiving elements for integrating additional components of the coffee machine.

7. The coffee machine according to claim 4, further comprising at least one of a safety valve, a temperature sensor, and a reed switch as a water level sensor as an additional component.

8. The coffee machine according to claim 1, further comprising a heating rod thermally connected to the pipe of the continuous flow heater by means of at least one flat contact surface.

9. The coffee machine according to claim 8, further comprising at least two heating rods thermally connected to the pipe of the continuous flow heater by means of at least one flat contact surface.

10. The coffee machine according to claim 9, wherein the arrangement of the pipe and heating rods is held together by a sleeve.

11. The coffee machine according to claim 10, further comprising a temperature sensor mounted to the sleeve.

12. The coffee machine according to claim 7, further comprising a temperature sensor disposed on the sleeve.

13. The coffee machine according to claim 1, wherein the flexible tube connecting piece comprises sealing means which abut against an inner wall of the pipe by which means the flexible tube connecting piece is connected to the ends of the pipe in a sealed manner.

14. The coffee machine according to claim 13, wherein the sealing means is formed by an O-ring seal inserted in an annular groove on the outer circumference of the flexible tube connecting piece.

15. The coffee machine according to claim 14, wherein at least two axially spaced O-ring seals are provided on the flexible tube connecting pieces.

16. The coffee machine according to claim 1, wherein the flexible tube connecting piece has a substantially conical shape and is inserted in a corresponding conical end of the pipe.

17. The coffee machine according to claim 5, wherein the securing means secures the continuous flow heater in the housing in a position where the continuous flow heater is securely held at least a predetermined distance from other components of the coffee machine.

18. The coffee machine according to claim 6, wherein the securing means secures the continuous flow heater in the housing in a position where the continuous flow heater is securely held at least a predetermined distance from other components of the coffee machine.

* * * * *

UNITED STATES PATENT AND TRADEMARK OFFICE
CERTIFICATE OF CORRECTION

PATENT NO. : 8,528,467 B2  Page 1 of 1
APPLICATION NO. : 10/587296
DATED : September 10, 2013
INVENTOR(S) : Magg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2172 days.

Signed and Sealed this
Fifteenth Day of September, 2015

Michelle K. Lee
*Director of the United States Patent and Trademark Office*